(12) United States Patent
Young et al.

(10) Patent No.: US 7,277,305 B2
(45) Date of Patent: Oct. 2, 2007

(54) POWER CONVERTER

(75) Inventors: George Young, County Dublin (IE); Peter Michael Meaney, County Cork (IE); Andrew Bernard Keogh, County Cork (IE)

(73) Assignee: Commergy Technologies Limited, Dublin (IE)

( * ) Notice: Subject to any disclaimer, the term of this patent is extended or adjusted under 35 U.S.C. 154(b) by 0 days.

(21) Appl. No.: 10/509,027

(22) PCT Filed: Mar. 27, 2003

(86) PCT No.: PCT/IE03/00049

§ 371 (c)(1),
(2), (4) Date: Jun. 3, 2005

(87) PCT Pub. No.: WO03/081759

PCT Pub. Date: Oct. 2, 2003

(65) Prior Publication Data
US 2005/0231254 A1   Oct. 20, 2005

(30) Foreign Application Priority Data
Mar. 27, 2002   (IE) ............................... S2002/0224

(51) Int. Cl.
*H02M 7/5387* (2006.01)
(52) U.S. Cl. ..................... 363/132; 363/16; 323/275
(58) Field of Classification Search ............ 363/34–41, 363/44, 89, 126, 95, 96–98, 132, 16; 323/281, 323/275, 222, 282
See application file for complete search history.

(56) References Cited

U.S. PATENT DOCUMENTS

| 4,353,113 | A | 10/1982 | Billings |
| 5,315,498 | A | 5/1994 | Berrios et al. |
| 5,442,540 | A | 8/1995 | Hua et al. |
| 5,847,589 | A | 12/1998 | Kuki et al. |
| 5,986,904 | A | 11/1999 | Jacobs et al. |
| 6,191,567 | B1 | 2/2001 | Sluijs |
| 6,282,111 | B1 | 8/2001 | Illingworth |
| 6,545,884 | B2 * | 4/2003 | Curtiss ......................... 363/37 |

FOREIGN PATENT DOCUMENTS

| EP | 0 425 875 A | 5/1991 |
| JP | 07-046853 A | 2/1995 |
| JP | 09-191642 A | 7/1997 |
| JP | 10-080151 A | 3/1998 |
| JP | 11-146648 A | 5/1999 |

(Continued)

OTHER PUBLICATIONS

Patent Abstracts of Japan, vol. 1998, No. 8, Jun. 30, 1998.

(Continued)

*Primary Examiner*—Rajnikant B. Patel
(74) *Attorney, Agent, or Firm*—Birch, Stewart, Kolasch & Birch, LLP

(57) ABSTRACT

A heavy duty cycle power converter (2) has current mode control in which the closed loop control is carried out by a controller (5) using a desired signal (11) which is a function of the difference between the desired duty cycle (7) and the measured duty cycle (6). This fluctuates current mode control without voltage feedback.

19 Claims, 3 Drawing Sheets

FOREIGN PATENT DOCUMENTS

Figure 1:
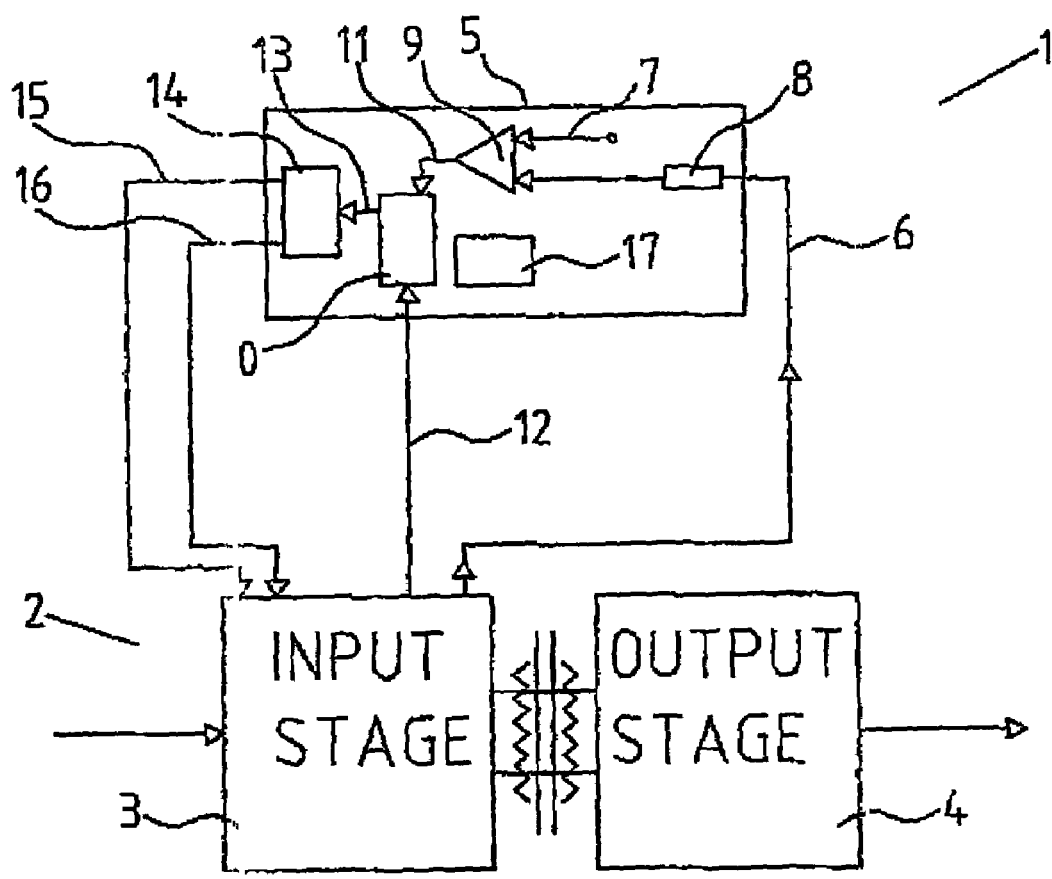

| | | |
|---|---|---|
| JP | 11-196580 A | 7/1999 |
| JP | 2000-341947 A | 12/2000 |
| JP | 2001-211666 A | 8/2001 |
| JP | 2001-238443 A | 8/2001 |
| JP | 2001-339944 A | 12/2001 |
| JP | 2002-272141 A | 9/2002 |
| JP | 2002-320385 A | 10/2002 |
| JP | 2002-325458 A | 11/2002 |

OTHER PUBLICATIONS

Patent Abstracts of Japan, vol. 1995, No. 5, Jun. 30, 1995.
Patent Abstracts of Japan, vol. 2003, No. 2, Feb. 5, 2003.
Patent Abstracts of Japan, vol. 1999, No. 12, Oct. 29, 2003.
Patent Abstracts of Japan, vol. 2003, No. 1, Jan. 14, 2003.
Patent Abstracts of Japan, vol. 2000, No. 25, Apr. 12, 2001.
Patent Abstracts of Japan, vol. 1997, No. 11, Nov. 28, 1997.
Patent Abstracts of Japan, vol. 2003, No. 3, May 5, 2003.
Patent Abstracts of Japan, vol. 2002, No. 4, Aug. 4, 2002.
Patent Abstracts of Japan, vol. 2000, No. 15, Apr. 6, 2001.
Patent Abstracts of Japan, vol. 1999, No. 10, Aug. 31, 1999.
Patent Abstracts of Japan, vol. 2000, No. 25, Apr. 12, 2001.

* cited by examiner

POWER CONVERTER

The present invention relates to a high duty cycle power converter with a variable signal current mode control, namely operating at a duty cycle over 90%.

The invention is directed towards providing a method of providing signals to implement current mode control and clamping the voltage of a high frequency power converter. The invention is further directed to improving the current mode control of a high duty cycle power converter during start-up.

It is desirable to operate a power converter at close to maximum duty cycle. The stress on components is minimised as current flows for almost all of the operating cycle. The transitions occur at fixed times, and thus it is relatively easy to provide for the switch-off of one device to generate a condition where a complimentary switch can be turned on in a lossless fashion. The need to store energy in input and output filter elements is limited due to the virtually continuous nature of power being drawn from the source and transferred to the load.

In operating double ended power converters it is normally necessary to provide a balanced drive for the input switches of the converter, in order to avoid transformer saturation. This is achieved normally using current-mode control. A problem with operating converters at high duty cycle without the normal output voltage feedback is that there is no voltage error signal available to control the inner current loop in such converters.

An example of such a converter is disclosed by a publication "Texas Instruments/Unitrode Seminar Series 1999/2000", which discloses an isolated converter section, which is closely coupled with one or more downstream buck converters. However, a problem with this type of voltage closed loop control is that it is difficult to implement and compromises the balance of the converter, especially operating at high frequencies.

Further examples of closed loop control for power converters are disclosed by U.S. Pat. No. 6,429,709, U.S. Pat. No. 5,646,513 and PCT Publication No. WO 02/097973. However, none of these documents disclose a power converter which solves the above-mentioned problems.

It will be appreciated that in this specification, the term "high duty cycle" is any power converter which has a duty cycle operation of over 90%. Further, the term "high frequency" is meant to typically mean any frequency above 20 KHz.

The present invention is directed towards providing a high frequency power converter for overcoming the above-mentioned problems.

The invention is particularly directed towards achieving balance in the transformer drive for such a converter using current mode control. The invention is also directed to arrangements for clamping the voltage appearing on the switching devices of such a converter, to arrangements for start-up and shut-down of such a converter, and to a cost-effective means for providing drive of the "high side" switches in such a converter.

STATEMENTS OF INVENTION

According to the present invention, there is provided a high duty cycle frequency power converter having a closed loop variable signal current mode control characterised in that the variable signal is changed by a derived amount which is derived as a function of the difference between the desired duty cycle and the measured duty cycle.

The advantage of using a duty cycle control closed loop is that it is now much easier to implement current mode control in a power converter. In the prior art solutions, current mode control operates as an inner control loop with an overall voltage feedback. Using a power converter where one elects not to regulate the output voltage can imply that the benefits of current mode control such as balance between phases in double-ended converters such as full bridge and push-pull topologies are not available.

Preferably, the derived signal is referenced with the variable signal to provide a control signal in a controller to change the variable signal to operate the current mode control.

Ideally, means for measuring the measured duty cycle from input switching elements of the input switching stage of the power converter by measuring the conducting time interval of each switching element during a preset time interval.

The desired duty cycle is set on a deadtime requirement consistent with substantially lossless switching, which duty cycle may be fixed in the range 90% to 99%.

Means may be provided to change the desired duty cycle having regard to operating parameters, one of which operating parameters is the load on the high duty power converter.

In another embodiment, means are provided to deliver a signal analogous to the measured duty cycles.

Preferably, the means comprises an averaging circuit which provides a signal analogous to the measured duty cycle.

Ideally, the controller comprises an error amplifier to compare the desired duty cycle signal with the measured duty cycle signal to provide the derived signal.

Preferably, the controller to operate the current mode control comprises means for generating drive signals from the control signal to modify the duty cycle of the input switching elements of the input switching stage.

In an embodiment of the invention, the output of the power converter is used to clamp the voltage of the power converter.

In another embodiment of the invention, to achieve this, a diode is connected in parallel with an output inductor of the power converter to clamp the voltage of the power converter and a resistor is placed in series with the diode and connected in parallel with the output inductor. The advantage of this embodiment is that due to the fact that the on-state voltage of a switching node of a power converter is very close to the output voltage in normal operation, they frequently have a voltage level corresponding to the normal drop across one or, more generally, a small number of diodes. By placing the diode in parallel with the main output inductor of the power converter, this clamps the voltage at the converter output switching node at a level close to the output operating voltage. This minimizes the problem of switching spike voltages and can allow the use of transistors or other switching elements with lower voltage ratings.

A further improvement and advantage to this approach usually involves the provision of a resistor or resistors in series with the diode or diodes in order to limit the rate of rise of voltage across the output capacitor and the current in the diode used for clamping.

In a further embodiment of the invention, there is provided means to adjust the effective duty cycle to remove input ripple voltages. Ideally, there is provided at least one saturable reactor connected to an output switching element to adjust the duty cycle of the power converter. Preferably, the saturable reactor provides a controllable reset condition for the output switching elements to adjust the duty cycle of the power converter. The advantage of adjusting the duty cycle is that it allows for correction of ripple components in the input voltage of the power converter, while operating at the desired duty cycle. Further, there may be provided a reset winding having a control signal derived from a closed loop monitoring of the output voltage or alternatively the reset winding may have a control signal obtained from a prediction of the needed ripple voltage requiring cancellation.

A separate auxiliary winding may be connected to the primary winding of the converter to provide an auxiliary gate drive signal to switches. This is a simple form of drive for the high-side input switches. Additionally, a clamp circuit may be connected to the midpoint of the primary winding. This will assist in start-up of this drive arrangement.

The present invention can also be used in combination with an isolated power converter operating at near full duty cycle. This is highly desirable for cascaded power converters.

In another embodiment of the present invention, there is provided a method of controlling a high duty cycle power converter having a current mode control comprising the steps of:
 measuring the duty cycle of the power converter,
 comparing a desired duty cycle with the measured duty cycle to provide an error signal;
 referencing the derived signal with a current sense signal from the power converter to provide a logic signal; and
 generating drive signals from the logic signals to implement a closed loop current mode control in the power converter.

DETAILED DESCRIPTION OF THE INVENTION

Figure 2:
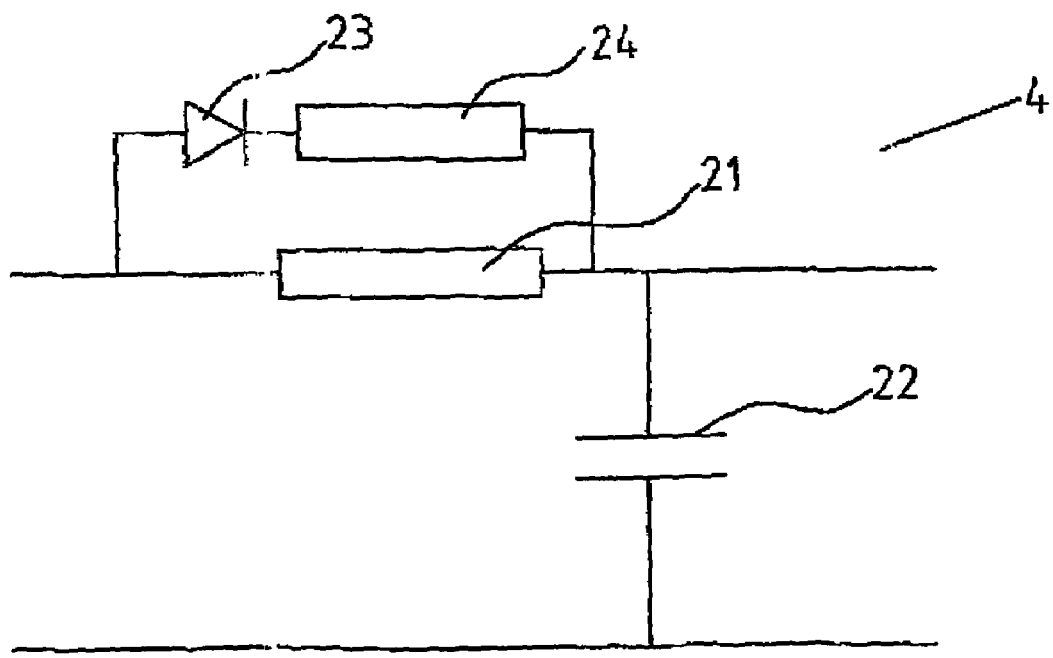
Figure 3:
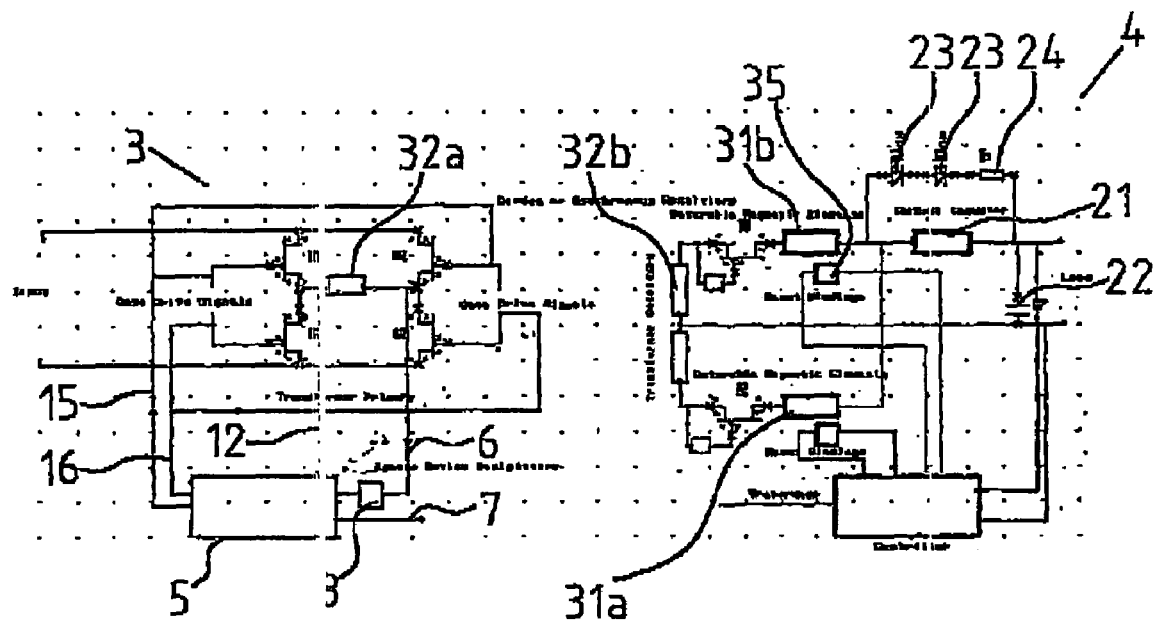
Figure 4:
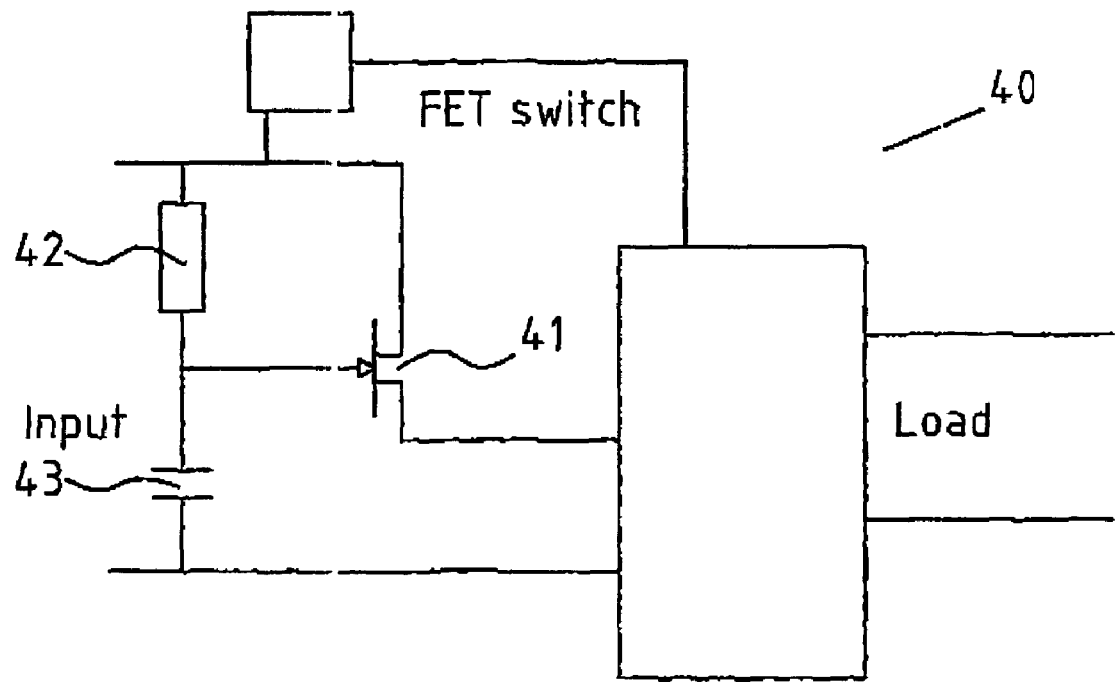
Figure 5:
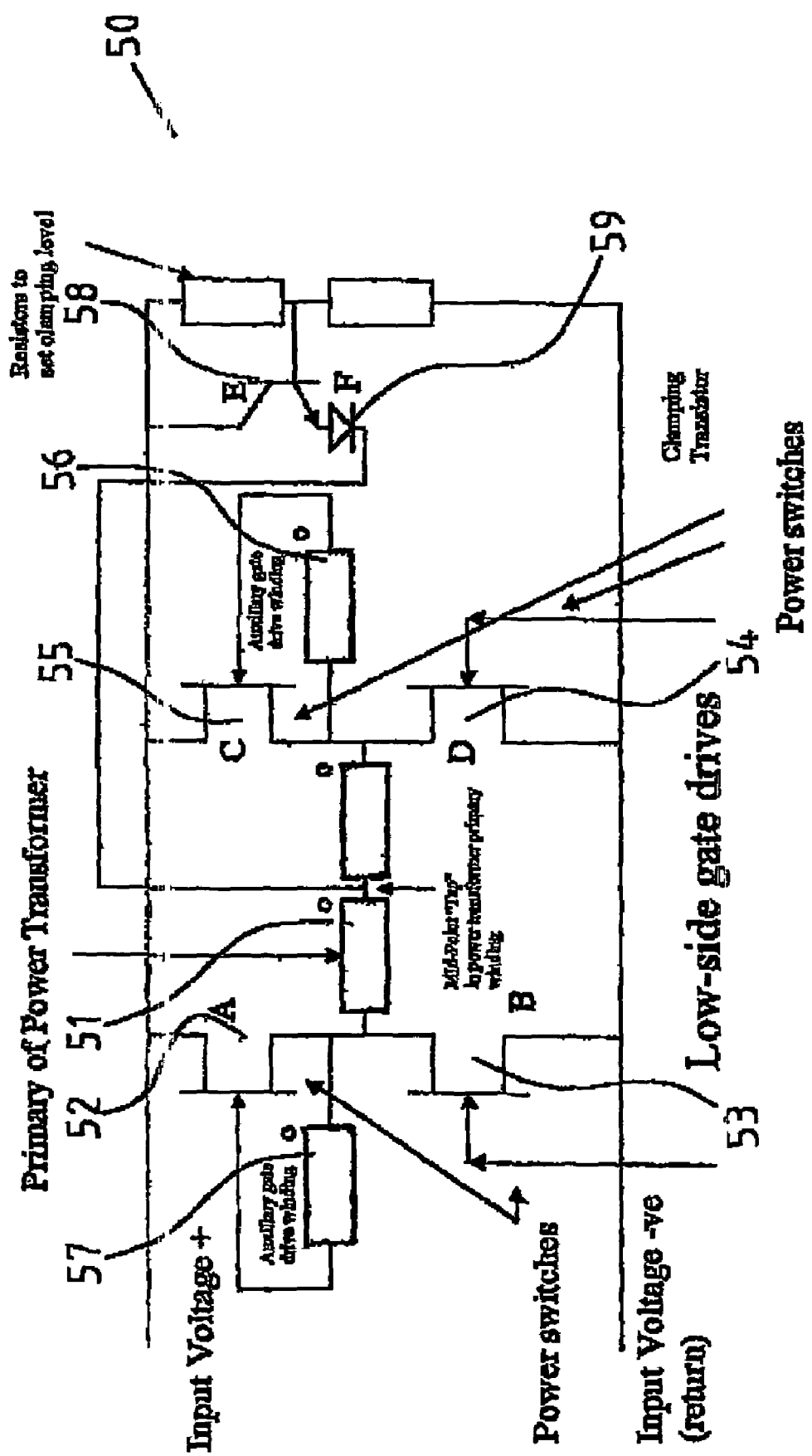

The invention will be more clearly understood from the following description of some embodiments thereof, given by way of example only, with reference to the accompanying drawings, in which:

FIG. 1 illustrates a controller for a power converter for carrying out the present invention, FIG. 2 illustrates an additional control embodiment of the present invention, FIG. 3 illustrates a controller approach having limited control range for correction of small input ripple components, FIG. 4 illustrates linear regulator control according to another aspect of the present invention, and FIG. 5 is a circuit showing how input high side switches can be self driven.

Referring to FIG. 1, there is illustrated a closed loop control for a high duty cycle power converter, indicated generally by the reference numerals 1 and 2 respectively. The converter 2 comprises an input switching stage 3 and an output switching stage 4, only shown in outline. The closed loop control 1 is provided by a controller 5. The operation of the power converter is discussed in detail below.

A measured duty cycle 6 of the power converter is fed into an averaging circuit 8 of the controller 5. Values analogous the measured duty cycle produced by the averaging circuit 8 are fed to an error amplifier 9 also connected to a desired duty cycle 7 which in turn provides a derived signal 11 to a logic circuit 10 in the controller 5. A variable signal 12 measured from the power converter 2 is also fed into the logic circuit 10. The derived signal 11 from the error amplifier 9 changes the variable signal 12 to provide a control signal 13 generated to an output driver circuit 14 which generates drive signals 15 and 16 to control the duty cycle of the power converter 2 and hence provide current mode control. An oscillator 17 controls the frequency at which the controller 5 generates the drive signals 15 and 16.

It will be appreciated that the controller 5 controls the duty cycle of the power converter 2 to provide closed loop current mode control as opposed to the output voltage of the converter 2 as normally is the case. Some variants are possible allowing the desired setting for the duty cycle to be dependent on, for example load current and/or input voltage of the converter 2.

In operation, the measured duty cycle 6 is measured from the input stage of the power converter 2. The measured duty cycle 6 is obtained by measuring the conducting time interval of each switching element of the input switching stage 4, during a preset time interval which is normally expressed as a percentage value. The term "effective duty cycle" is the time when material current is flowing. While the input duty cycle is effectively fixed, this signal is modulated and changed to provide the effective duty cycle. This measured duty cycle 6 value is fed into an averaging circuit 8 to provide a signal analogous to the measured duty cycle 6. The desired duty cycle 7 is fed directly to the error amplifier 9. These two signals are compared by the error amplifier 9 to provide the derived signal 11 which is a function of the difference between the desired duty cycle 7 and the measured duty cycle 6. This derived signal 11 changes the variable signal 12 which implements current mode control to provide a control signal 13 which in turn provides drive signals 15, 16 to implement closed loop duty cycle control to maintain current mode control. It will be appreciated that if the desired duty cycle equals the measured duty cycle, then the error amplifier 9 provides a signal to the logic circuit 10 to provide current mode control and to provide stable output derived signals 15 and 16 to ensure closed loop duty cycle control is achieved.

Referring now to FIG. 2 there is illustrated an additional improvement of the present invention at the output switching stage 4 of the converter 2. A standard LC filter indicated by an inductor 21 and a capacitor 22 is connected between the switches of the power converter (not shown) to the output voltage. A diode 23 and a resistor 24 connected in series and in parallel with the inductor 21 clamps any deviating voltage to a level very close to the output voltage of the power converter. The resistor is preferably a controlled saturable resistor.

Operating at high duty cycle typically means that the driving voltage is within 1V, for example, of the output voltage and the diode 23 used in parallel with the output inductor 21 is a very effective and simple clamp. Without loss of generality, the diode 23 may comprise a number of diodes or a zener-diode type element or any other means to use the output of the power converter 2 to provide clamping.

In operation, the stresses on the diode 23 during turn on can be very severe as effectively a voltage source at the input is being fed into the uncharged capacitor 22. Depending on factors such as a soft-start approach, which can be adopted, the current limiting behavior and leakage inductance's, it may be necessary to place the resistor 24 in series with the diode 23. This involves a certain trade off in the clamping effectiveness.

Referring now to FIG. 3, there is illustrated a detailed schematic of a typical power converter 2 having an input switching element 3 and an output switching element 4 incorporating the present invention. The operation of the switching elements are not discussed in detail as they do not form part of the present invention. Saturable reactors 31a and 31b are connected at the output switching stage 4 of the power converter 2. The saturable reactors 31a, 31b have the ability to adjust slightly the duty cycle to achieve removal of input ripple components of the converter 2. This requires an adjustment of the duty cycle, between 90% and 95% (or even as high as 99%) as illustrative values in the case of typical high duty cycle power converters, where the input ripple to the power converter would be the residual rectified mains/line voltage which would appear across the capacitor 22 in the power factor correction stage. Typically, the input ripple is 2-4% and is present at the output of the power factor correction stage, as well as correcting for voltage drops due to device losses. By adjusting the effective duty cycle by controlling the saturable reactors 31a, 31b, the rectified input ripple is removed.

A particularly suitable implementation of the present invention is the controlled saturable reactor 31a, 31b approach, but one envisages as alternatives the usage of auxiliary semi-conductor switching elements. Any suitable saturable magnetic element may also be used.

It will be appreciated that a full-bridge output stage can also be configured based on the desired power level and transformer implementation. In this case, the diagonal pairs of input switches are driven alternately with a fixed drive waveform having a fixed deadtime or possibly adaptive depending on load or other parameters. The output switching elements are connected in series with the saturable magnetic elements, namely the reactors 31a, 31b which assist in bridge soft-switching but also whose reset condition can be controlled, giving a variable deadtime and thus adjustment of the effective duty cycle and output voltage. The range of control adjustment in practice will be determined by the desire to keep lossless switching conditions for the input switches over most load conditions, and this will be determined by the values of magnetising inductance and leakage inductance in the main power transformer shown (32a, 32b) and by any commutating inductance which may be placed in series with windings of this transformer (32a, 32b).

Reset windings 35 and 36 are provided to operate under a control signal derived either from a closed loop monitoring of the output voltage or by a prediction of the needed ripple voltage requiring cancellation.

Power converters of this type are designed for normal operation in conditions of continuous operation at high duty cycle. Such converters will typically perform poorly or exhibit conditions of high stresses on components if they are not operating at high duty cycle. It is thus important to derive approaches which control the behavior of the circuit on start-up and in current limit conditions.

In start-up, the normal behavior of most controllers for power converters is to increase the duty cycle gradually up to the desired level. Implementing this approach can result in high peak currents, which may be acceptable, in inductor saturation and in excessive transient electromagnetic interference. Addressing these issues may result in over-specification of components as compared with what would be required in normal operation.

A converter of this type may also be unsuited to gradual increase of the duty cycle as normally used in conventional power converters. If this type of converter is not used in association with a preregulator or postregulator, it may be necessary to use a linear dissipative regulator to control the turn-on and/or turn-off transition".

Referring to FIG. 4, there is illustrated a form of linear regulator control according to another aspect of the present invention, indicated by the reference numeral 40. In start-up, the position is eased if the converter is preceded by a converter such as a buck type where the rate of voltage rise is relatively easily programmed. Operating from a boost pre-converter or fixed voltage source 41 does not however give this condition. The most cost-effective approach may often be to put a linear voltage-control circuit before such a converter. This is particularly the case if there is under voltage lockout protection on downstream circuitry such that minimal load current is drawn until the drop across the linear regulator. An example of such a linear regulator is shown in FIG. 4. The implementation is with an FET device 42 connected to a resistor 42 and capacitor 43 with an RC time constant determining the rate of rise and with the gate driven about the input supply rail in normal operation of the circuit. Other implementations of this circuit are possible, such as with the load converter being connected to the drain of the FET device 42.

In current limit, it is often attractive in this type of circuit to implement a "latch and retry" circuit. Here the current is continuously monitored and after a clear over-current condition is detected, the converter is turned off. The soft-switching approach, implemented possibly as in FIG. 4 or in a preceding converter stage, is then used to restart the converter after some interval.

It will be appreciated in this specification that the invention is particularly effective for power converters having a high duty cycle. In many cases it may be commercially advantageous to use such a converter in cascade with a non-isolated converter to realise the overall power conversion function. The non-isolated converter is usually a simple buck converter with variable duty cycle and its combination with an isolated converter operating with near full duty cycle offer performance and cost advantages when compared with conventional approaches of using a variable duty cycle isolated converter.

Many forms of output rectifier, for example, synchronous or diodes may be used.

It will also be appreciated, to operate the power converter at near fully duty cycle, it is usually only relevant to consider "double-ended" topologies where the core reset is provided inherently. Topologies such as the half bridge, full bridge and push-pull converter type are thus controlled by the present invention. The present invention provides a power convert which can be cascaded with a non-isolated back or boost converter. This latter converter can act as a pre-regulator or post-regulator allowing the isolation stage to operate under optimal conditions with a rear fixed voltage transformation ratio.

Referring now to FIG. 5, there is illustrated another embodiment of a high duty cycle power converter having a primary stage comprising either the push-pull, the half bridge or the full bridge configuration of a high duty cycle power converter, indicated generally by the reference numeral 50. The input stage 3 of the power converter 2 comprises a primary winding 51 of a transformer connected to input rectifying switches 52, 53, 54 and 55. Switches 54 and 55 have a separate auxiliary winding 56, 57 connected to the gate of switches 54 and 55. Each auxiliary winding 56, 57 is connected to the primary winding 51.

This circuit has four switches as shown in FIG. 5, and is an implementation of particular value in this type of high duty cycle power converter. The switches 52-55, in the context of this high duty-cycle converter, are driven such that:

Assuming initially switches 52 and 54 are on
When switch 54 is turned off, the magnetising current in the winding, aided in many configurations by the reflected load current, will cause the winding voltage to "flip" such that the voltages across switches 53 and 55 are now each zero. During the transition, zero and then negative drive voltage from the coupled winding is applied to switch 52, and switch 52 is thus turned off.

The drive to switch 53 can then be turned on with lossless switching in switch 53. The power transfer occurs as normal in this part of the cycle, and then when the drive to switch 53 is removed, the resonant transition can occur as before with some deadtime when all switches are off before switch 54 is turned on.

It will be appreciated that this circuit operation will not automatically commence on start-up. It is possible to enter the mode of operation where both upper switches 52 and 55 are off and no drive voltage is generated across the auxiliary gate drive windings 56, 57. To address this issue, adding a clamp circuit 58, 59 is appropriate, and one implementation is shown. Here the mid-point of the main transformer primary winding 51 is connected to the clamp circuit 58, 59, which seeks to hold this point within a certain range of voltage typically centred around half the input voltage. The clamp voltage levels are determined by the resistors as shown.

In this implementation, a transistor 58 is used to limit the extent to which the mid-point of the winding 51 can drop below one half of the input voltage. This means that as switch 53 is turned on, a voltage is developed across the transformer windings which rapidly turns on switch 53, and likewise if switch 54 is turned on, then switch 52 turns on. It will be appreciated that a significant current may be drawn from the transistor 58 but this is for a short time without any demanding high-frequency performance requirements. Thus, this device can be quite small. Diode 59 is provided to limit reverse stresses on transistor 58.

The usage of transistor 58 may also be of value in effecting soft-start, where it is desired to gradually increase the output voltage. Typically such circuits are used with preregulators and it may be desired to pass a slowly-rising input voltage condition to the output as a slowly-rising output voltage. In these conditions, the voltage appearing across the input windings may be insufficient to turn on the high-side devices, and the transistor 58 provides the high-side current during this transition.

In practice, the mid-point of the primary winding 51 will initially rise. As switch 53 is, for example, turned off, then switch 55 will remain on until such time as the voltage across the winding section is less than the threshold voltage of switch 55, in which case switch 55 will turn off. This asymmetric turn-off behaviour is inherent in the circuit and normally does not cause any issue.

The gate drive windings may either be connected directly to the gate terminals of the "high side" of switches 52, 54, or they may be connected via resistors or other passive networks and/or transistors, these additional elements being used to optimize the drive waveform as applied to the gate terminals.

It will be appreciated that a simple variant of this circuit may be used to provide high-side drive in the case of a current-fed variant of the above topology.

It will be understood without loss of generality that the switches 51-54 described above as FET devices or general transistors may be any type of gate-controlled switching device.

It will further be appreciated that the converter, illustrated in FIG. 5, finds particular application in a near-full duty cycle small deadtime interval between conduction intervals of switches 54 and 55, converter with limited input voltage variation. Such a converter may be applied for example in association with a buck preregulator or immediately after a boost power factor conversion stage.

It will be appreciated that many of the components of the various circuits illustrated may be replaced by other components which perform the same function. Since this will be obvious to those skilled in the art, mention of this has not been made in all instances where it could have been throughout the specification.

In the specification the terms "comprise, comprises, comprised and comprising" or any variation thereof and the terms "includes, included and including" or any variation thereof are considered to be totally interchangeable and they should all be afforded the widest possible interpretation. The term theoretical refers to the scientific community and not the inventor.

The invention is not limited to the embodiments hereinbefore described but may be varied in both construction and detail within the scope of the claims.

The invention claimed is:

1. A high duty cycle power converter (2) having a closed loop variable signal (12) current mode control characterised in that the variable signal (12) is changed by a derived signal (11) which is derived as a function of the difference between the desired duty cycle (7) and the measured duty cycle (6) and in which the output of the power converter (2) is used to clamp the voltage of the power converter (2) wherein a diode (23) is connected in parallel with an output inductor (21) of the power converter (2) to clamp the voltage of the power converter.

2. A high duty cycle power converter (2) as claimed in claim 1, in which the derived signal (11) is referenced with the variable signal (12) to provide a control signal (13) in a controller (5) to change the variable signal (12) to operate the current mode control.

3. A high duty cycle power converter (2) as claimed in claim 1, comprising means for measuring the measured duty cycle (6) from switching elements of the input switching stage (3) of the power converter (2) by measuring the on time interval of each switching element during a preset time interval.

4. A high duty power converter (2) as claimed in claim 1, in which the desired duty cycle is set on a deadtime requirement consistent with substantially lossless switching.

5. A high duty power converter (2) as claimed in claim 4, in which the desired duty cycle is fixed in the range 90% to 99%.

6. A high duty power converter (2) as claimed in claim 4, in which means are provided to change the desired duty cycle having regard to operating parameters.

7. A high duty power converter (2) as claimed in claim 6, in which the operating parameter is the load on the high duty power converter (2).

8. A high duty power converter (2) as claimed in claim 1, in which means are provided to deliver a signal analogous to the measured duty cycles.

9. A high duty cycle power converter (2) as claimed in claim 8, in which the means comprises an averaging circuit (8).

10. A high duly cycle power converter (2) as claimed in claim 1, in which the controller (5) comprises an error amplifier (9) to compare the desired duty cycle signal (7) with the measured duty cycle (6) signal to provide the derived signal (11).

11. A high duty cycle power converter (2) as claimed in claim 1, in which the controller (5) to operate the current mode control comprises means for generating drive signals (15, 16) from the control signal (13) to modify the duty cycle of the input switching elements of the input switching stage (3).

12. A high duty cycle power converter (2) as claimed in claim 1, in which a resistor (24) is placed in series with the diode (23) and connected in parallel with the output inductor (21).

13. A high duty cycle power converter (2) as claimed in claim 1, in which there is provided means to adjust the effective duty cycle to compensate for ripple voltages.

14. A high duty cycle power converter (2) as claimed in claim 13, in which there is provided a saturable reactor (31a, 31b) connected to output switching elements of the output switching stage (4) of the power converter to adjust effective duty cycle of the power converter (2).

15. A high duty cycle power converter (2) as claimed in claim 14, in which the saturable reactor (31a, 31b) is provided with a controllable reset condition to provide a delay for the output switching elements to adjust the effective duty cycle of the power converter.

16. A high duty cycle power converter (2) as claimed in claim 13, comprising a reset winding having a control signal derived from a closed loop monitoring of the output voltage.

17. A high duty cycle power converter (2) as claimed in claim 13, in which the means to adjust the effective duty cycle comprises a reset winding having a control signal obtained from a prediction of the needed ripple voltage requiring cancellation.

18. A high duty cycle power converter (2) as claimed in claim 1, in which a separate auxiliary winding (56, 57) is connected to the primary winding (51) of the converter to provide an auxiliary gate drive signal to switches (52, 55).

19. A high duty cycle power converter (2) as claimed in claim 1, in which a clamp circuit (58, 59) is connected to the midpoint of the primary winding (51).

* * * * *